United States Patent [19]

Dockery

[11] Patent Number: 4,490,250

[45] Date of Patent: Dec. 25, 1984

[54] AQUARIUM FILTERING SYSTEM

[75] Inventor: Denzel J. Dockery, Ponce De Leon, Fla.

[73] Assignee: Vortex Innerspace Products, Ponce De Leon, Fla.

[21] Appl. No.: 589,022

[22] Filed: Mar. 13, 1984

[51] Int. Cl.³ .................... E04H 3/20; B01D 35/02
[52] U.S. Cl. .................................. 210/169; 210/196;
 210/232; 210/282; 210/416.2
[58] Field of Search .............. 210/169, 196, 232, 238,
 210/258, 282, 416.2; 119/5

[56] References Cited

U.S. PATENT DOCUMENTS

| | | | |
|---|---|---|---|
| 3,549,015 | 12/1970 | Willinger | 210/416.2 |
| 3,685,919 | 8/1972 | Speck | 210/416.2 |
| 3,747,762 | 7/1973 | White | 210/169 |
| 4,039,453 | 8/1977 | Horvath | 210/169 |
| 4,105,555 | 8/1978 | Pease | 210/169 |
| 4,268,387 | 5/1981 | Hall | 210/169 |

*Primary Examiner*—Ernest G. Therkorn
*Attorney, Agent, or Firm*—Gifford, VanOphem, Sheridan, Sprinkle & Nabozny

[57] ABSTRACT

The present invention provides a fluid filtering system for an aquarium having a tank in which water and marine animals are contained. The filtering system includes a pump, a filter element and a valve assembly fluidly connected therebetween. In addition, a pump actuator is movable between a first position and a second position in which the pump inlet and outlet are inverted. Actuation of the valve assembly to a first position and with the pump actuator in its first position allows the pump to pump water from the aquarium tank under pressure to and through the filter element after which the cleaned water is returned to the aquarium tank. Conversely, with the valve assembly and pump actuator in their second positions, the pump draws water from the aquarium tank, through the filter element and the cleaned water is then returned by the pump to the aquarium tank. Pressure pumping, i.e. with the valve assembly and pump actuator in their first positions, enables self priming of the filter system whereas vacuum pumping, i.e. with the valve assembly and pump actuator in their second positions, reduces the amount of harmful gasses dissolved in the water.

6 Claims, 12 Drawing Figures

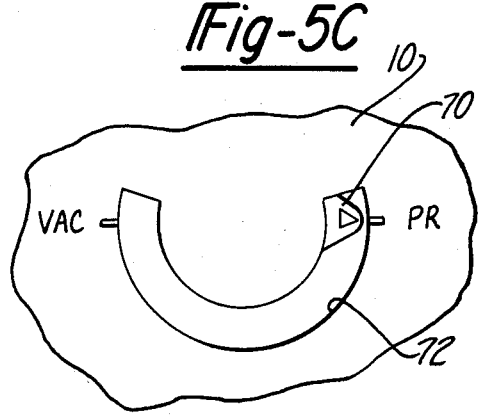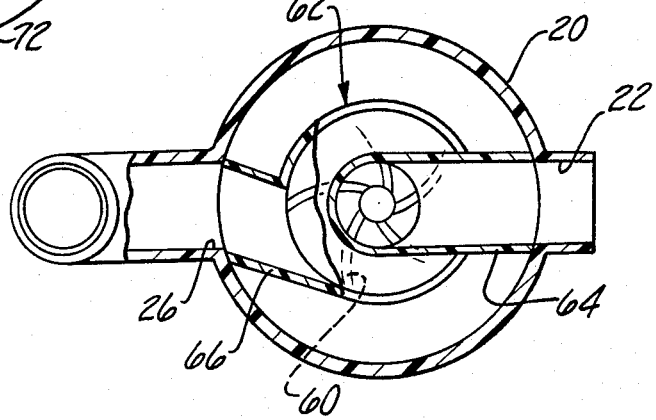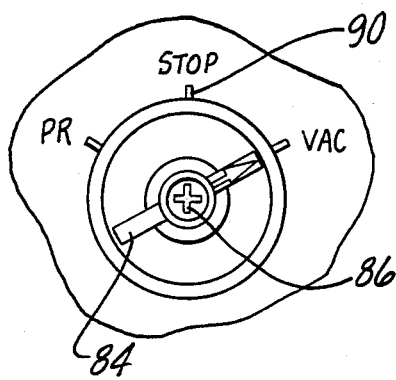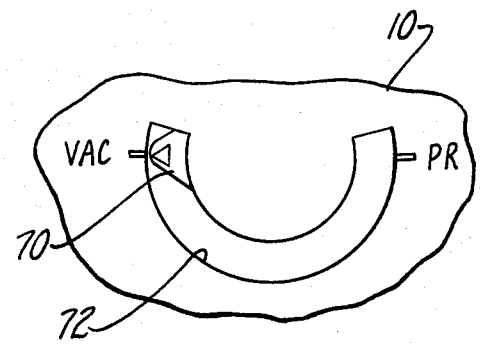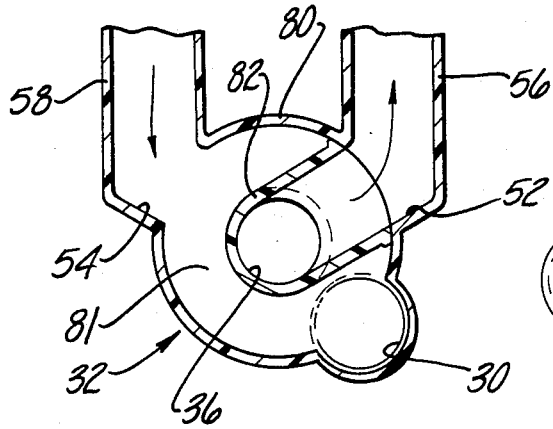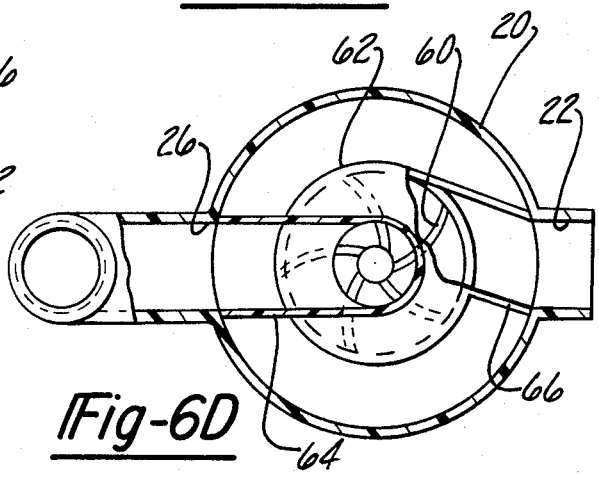

AQUARIUM FILTERING SYSTEM

BACKGROUND OF THE INVENTION

I. Field of the Invention

The present invention relates generally to aquarium filtering systems and, more particularly, to an aquarium filtering system which enables either vacuum or pressure pumping of the water through the filter system.

II. Description of the Prior Art

There are many types of previously known aquarium filtering systems which utilize both a water pump and a filter element to remove debris from the aquarium water. In one type of previously known system known as a pressure pumping system, the pump inlet is fluidly connected to the aquarium water while the pump outlet is connected to the inlet of the filter element. The outlet from the filter element is fluidly connected to the aquarium tank. Consequently, upon activation of the filter pump, the pump pumps water from the aquarium, through the filter element which removes foreign matter from the aquarium water and the clean water is then returned to the aquarium tank.

In still another type of aquarium filtering system the filter element inlet is connected to the aquarium tank while the filter element outlet is connected to the inlet of the pump. The pump outlet is then fluidly connected to the aquarium tank. Consequently, upon activation of the pump, the pump inducts water from the aquarium tank, through the filter element and then returns the cleaned water to the aquarium tank. This latter type of filtering system is commonly known as a vacuum filtering system since the aquarium water passes through the filter element under negative, rather than positive, pressure.

The primary advantage of the previously known pressure filtering system is that such systems are self priming and, therefore, very easy to start or restart. Such pressure systems, however, are disadvantageous since they typically produce pressures in excess of 10 psi at the inlet to the filter element. Such high pressures are known to dissolve harmful gases in the water.

Conversely, the advantage of the previously known vacuum filters is that, since the water is inducted through the filter element at a negative pressure, the amount of harmful gases dissolved within the water is greatly reduced, thus further protecting the marine life contained within the aquarium. However, these previously known vacuum filtering systems are not self priming and, therefore, are difficult to start or restart.

SUMMARY OF THE PRESENT INVENTION

The present invention provides an aquarium filtering system which overcomes all of the above mentioned disadvantages of the previously known systems.

In brief, the fluid filtering system of the present invention comprises a pump assembly, a filter having an inlet and an outlet and a valve assembly having four ports. One fluid port is connected to the filter element inlet, a second port is connected to the filter element outlet, a third port is connected to the pump assembly and the fourth port is connected to the aquarium tank. A valve member is movable between a first position and a second position. In its first position, the valve member simultaneously connects the first and third ports together and the second and fourth ports together. Conversely, in its second position the valve member fluidly connects the first and fourth ports together and the second and third ports together for the reasons described below.

In addition, the pump assembly includes a pump housing movable between a first position and a second position. In the first position, the pump outlet is fluidly connected to the third valve port while the pump inlet is fluidly connected to the aquarium tank. Thus, with both the valve assembly and the pump housing in their first positions, activation of the pump pumps water from the aquarium and pumps this water under pressure through the filter element and then to the aquarium tank. In this configuration, the filtering system is self priming.

Conversely, with both the valve assembly and pump housing in their second positions, activation of the pump inducts water under negative pressure from the aquarium tank and through the filter element. The cleaned water from the filter element is then returned by the pump to the aquarium. In this configuration, the dissolution of harmful gases in the water is minimized since vacuum pumping is employed.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIGS. 5A-5D are fragmentary views illustrating one mode of operation of the preferred embodiment of the invention; and FIGS. 6A-6D are fragmentary views similar to FIGS. 5A-5D but illustrating a different mode of operaton of the preferred embodiment of the invention.

DETAILED DESCRIPTION OF A PREFERRED EMBODIMENT OF THE INVENTION

Figure 1:
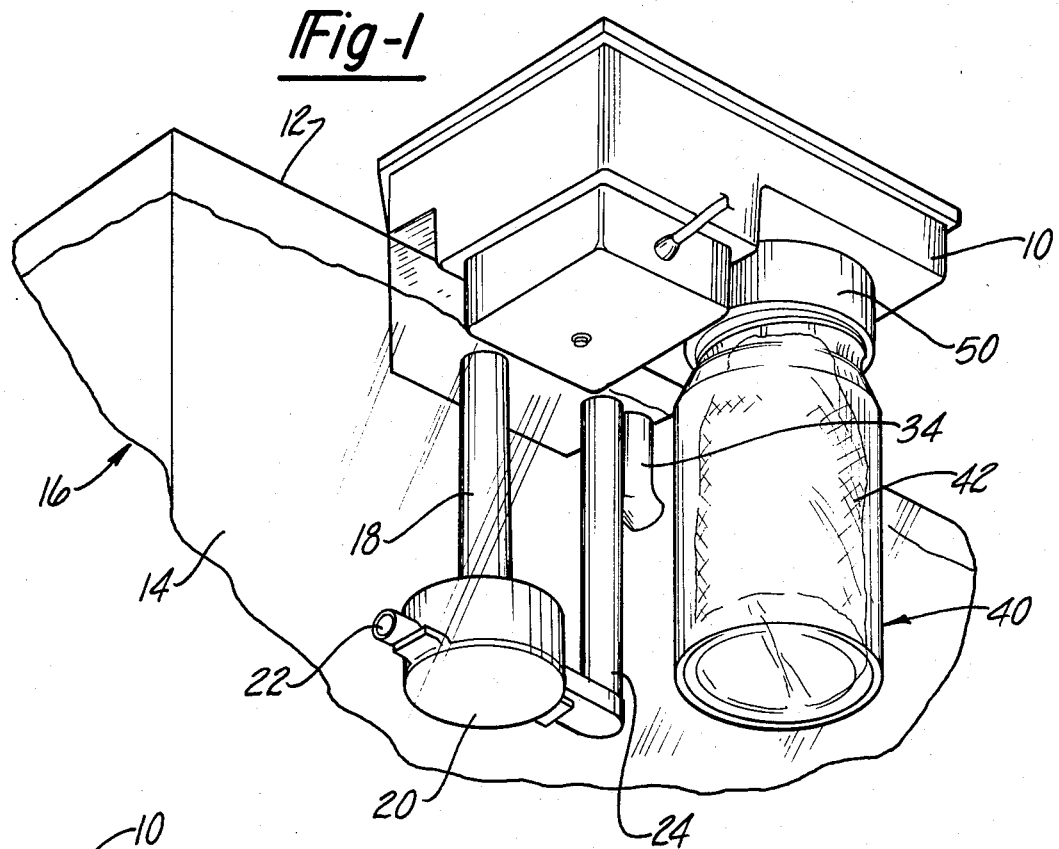
FIG. 1 is a perspective view illustrating a preferred embodiment of the present invention.
Figure 3:
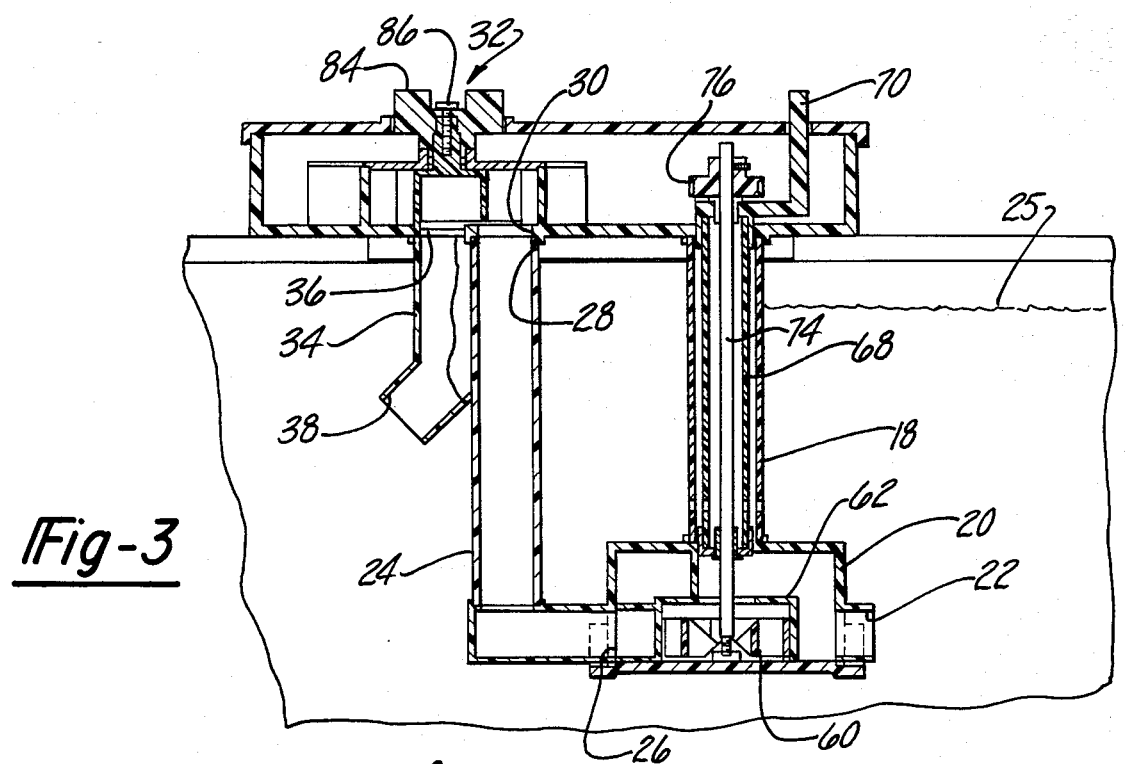
FIG. 3 is a cross-sectional view of the preferred embodiment of the invention taken substantially along line 3—3 in FIG. 2.
Figure 2:
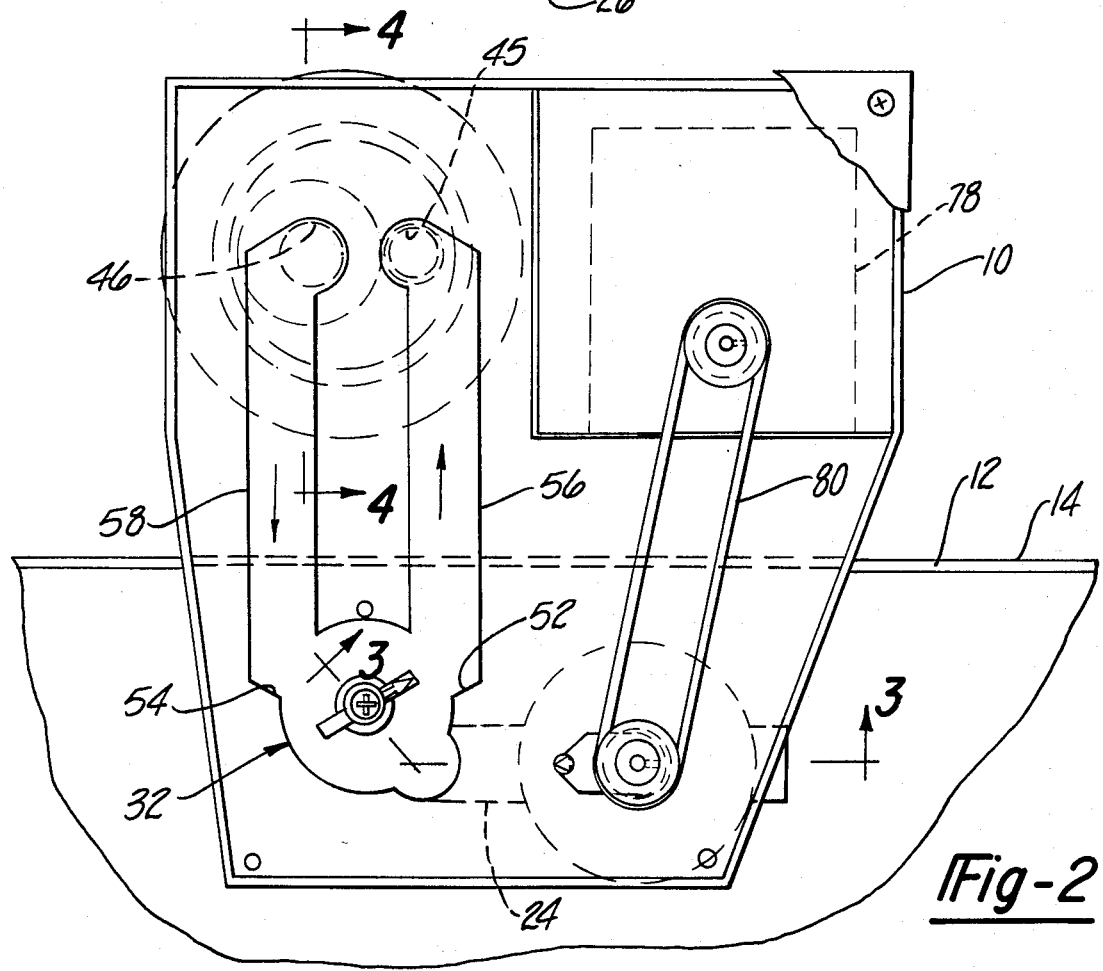
FIG. 2 is a top plan view of the preferred embodiment of the invention.

With reference first to FIGS. 1-3, a preferred embodiment of the aquarium filtering system of the present invention is thereshown and comprises a housing 10 which is supported on the upper edge 12 of one side 14 of an aquarium tank 16. A cylindrical tube 18 depends downwardly from the housing 10 inside of the aquarium tank 16 and supports a pump housing 20 at its lower end. The pump housing 20 includes a port 22 positioned below the waterline 25 of the aquarium tank 16 and thus in fluid communication with the aquarium water.

Still referring to FIGS. 1-3, the housing 10 further includes a fluid conduit 24, which is fluidly connected at one end to a fluid port 26 on the pump housing 20 which is diametrically opposed to the pump housing port 22. The other end 28 of the fluid conduit 24 is fluidly connected to one port 30 of a valve assembly 32. A further conduit 34 is fluidly connected at one end to a second port 36 in the valve assembly 32 and, at its other end 38, is open to and is positioned below the waterline 25 of the aquarium tank. The valve assembly 32 will be subsequently described in greater detail.

Figure 4:
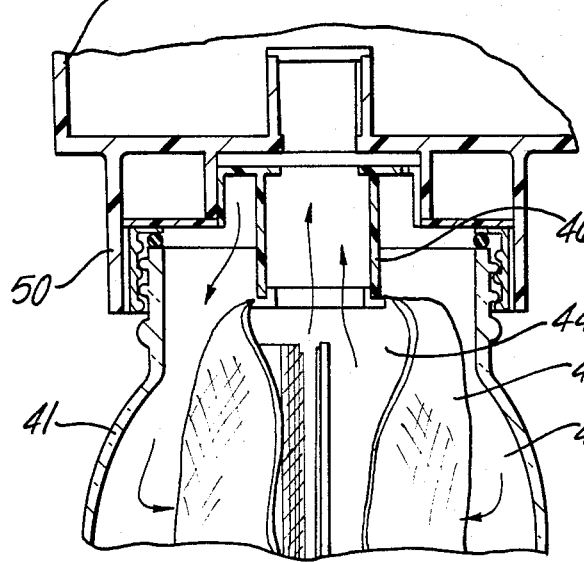
FIG. 4 is a fragmentary secontional view illustrating a portion of the preferred embodiment of the invention and taken substantially along line 4—4 in FIG. 2.

With reference now to FIGS. 1, 2 and 4, a filter assembly 40 is secured to and depends downwardly from the housing 10 outside of the aquarium tank 16. The filter assembly 40 includes a bag filter element 42 open at its top (FIG. 4) which may contain, for example, diatomaceous earth. The filter element is contained within a jar 41 and the interior of the filter element 42 which forms a filter outlet chamber 44 is attached to a fluid connector 46 on the housing 10. Conversely, a filter inlet chamber 48 is formed between the jar 41 and element 42 and is fluidly connected to a fluid port 45 (FIG. 2). Thus, water flow through the port 45 flows into the inlet chamber 48, through the filter element 42, to the outlet chamber 44 and out through the connector 46. As best shown in FIG. 4, the jar 41 is preferably threadably secured to a boss 50 on the housing 10 in order to facilitate cleaning and/or replacement of the filter element 42 as required.

With reference now particularly to FIG. 2, the valve assembly 32 includes two fluid ports 52 and 54. A fluid conduit 56 in the housing 10 fluidly connects the valve port 52 with the fluid port 45 and thus to the inlet chamber 48 of the filter element 42. Similarly, another fluid conduit 58 fluidly connects the valve port 54 with the connector 46 and thus with the outlet chamber 44 of the filter assembly 40.

With reference now to FIGS. 3, 5D and 6D, a pump impeller 60 is rotatably mounted within an impeller housing 62. The impeller housing 62 includes both an inlet tube 64 and an outlet tube 66 so that, when the impeller 60 is rotatably driven, water is inducted through the inlet tube 64 and is pumped out through the outlet tube 66.

As is best shown in FIG. 3, the impeller housing 62 is secured to a rotatable tube 68 which extends upwardly through the housing tube 18 and includes an actuating lever 70 attached to its upper end. As best shown in FIGS. 5C, 5D, 6C and 6D, this actuating lever is mounted within an arcuate slot 72 formed in the housing 10 and is movable from the position shown in 5C and to the position shown in 6C. With the actuating lever in the position shown in FIG. 5C, the impeller housing inlet tube 64 registers with the pump housing port 22 (FIG. 5D) while the outlet tube 66 registers with the port 26. Conversely, with the lever 70 in the position shown in 6C, the inlet tube 64 registers with the port 26 while the outlet tube 66 registers with the port 22. The purpose of the rotatable impeller housing 62 will be subsequently described.

With reference now to FIGS. 2 and 3, an elongated pump shaft 74 extends coaxially through the rotatable tube 68 and is secured at its lower end to the impeller 60. A pulley 76 is secured to the upper end of the pump shaft 74 and this pulley 76 is rotatably driven by an electric motor 78 and flexible belt 80.

With reference now to FIGS. 5A and 5B and 6A and 6B, the valve assembly 32 comprises a generally cylindrical housing 80 forming a cylindrical valve chamber 81 in which the ports 52 and 54, i.e. the ports which fluidly connect the valve assembly 32 to the filter assembly 40, extend radially outwardly from the housing 80 and are circumferentially spaced from each other. The valve port 36 which fluidly connects the valve assembly 32 with the aquarium through conduit 34 (FIG. 3) is coaxially opened to the lower end of the valve housing 80. Similarly, the port 30 which fluidly connects the valve housing 80 to the pump housing 20 through the conduit 24 is also open to the lower end of the pump housing 80 but is radially spaced from the port 36.

Still referring to FIGS. 6A, 6B, 5A and 5B the valve assembly 32 includes a valve element 82 in the form of an L-shaped fluid connector having one end fluidly connected with the valve port 36. The valve element 82 is rotatably mounted within the housing 80 between the position shown in FIG. 5B and the position shown in FIG. 6B. With the valve element 82 in the position shown in FIG. 5B, the valve member 82 fluidly connects the valve ports 36 and 54 together and the valve chamber 81 simultaneously fluidly connects the valve ports 52 and 30 together. Conversely, with the valve member 82 in the position shown in FIG. 6B, the valve element 82 fluidly connects the ports 36 and 52 together and the valve chamber 81 simultaneously fluidly connects the ports 30 and 54 together. A knob 84 (FIGS. 3, 5A and 6A) is secured to the valve member 82 by a screw 86 to rotate the valve member 82 between the positions shown in FIGS. 5B and 6B.

Figure 5A:
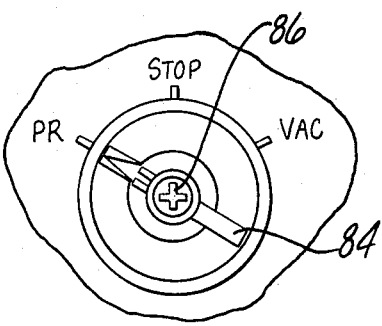
Figure 5B:
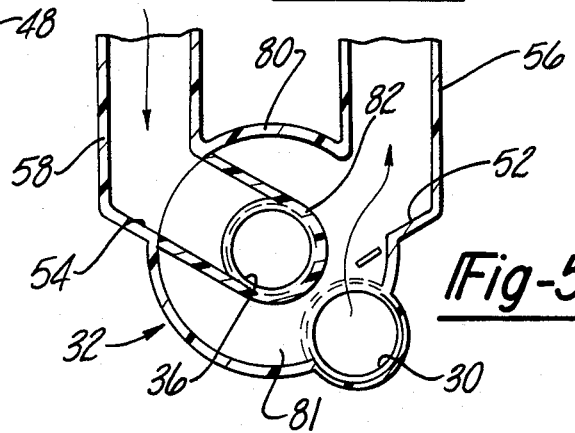

With reference now to FIG. 5, when first starting the filtering system of the present invention, the lever 70 is rotated to the position shown in FIG. 5C which positions the impeller housing 62 as shown in FIG. 5D so that its inlet tube 64 is open to the aquarium tank through the port 22. At the same time, the knob 84 is rotated to the position shown in FIG. 5A which positions the valve member 82 as shown in FIG. 5B.

Upon activation of the motor 78, the impeller 60 inducts water from the aquarium tank through port 22 and pumps this water under pressure through the pump housing port 26, conduit 24 and to the valve assembly port 30 (FIG. 5B). This pressurized aquarium water then flows to the filter assembly 40 through conduit 56 and the cleaned aquarium water returns through conduit 58. The valve member 82 then diverts the water flow from conduit 58 into the conduit 34 (FIG. 3) and thus to the aquarium tank 16. Since the impeller 60 pumps the aquarium water to the filter assembly 40 under pressure, the filter system of the present invention is self priming when valve assembly 32 and impeller housing 62 are in the position shown in FIG. 5.

After the entire filtering system of the present invention has been primed, i.e. filled with water, both the actuating lever 70 and knob 84 are rotated to the positions shown in FIG. 6. In doing so, the impeller inlet tube 64 (FIG. 6D) is aligned with the pump housing port 26 while the impeller outlet tube 66 is aligned with the port 22. Simultaneously, the valve member 82 fluidly connects the ports 36 and 52 together and the ports 54 and 30 together. Consequently, rotation of the impeller 60 by the motor 78 inducts water through the tube 34 and valve port 36 (FIG. 6B) and to the filter assembly 40 through the conduit 56. The cleaned aquarium water returns through conduit 58 and is inducted by the impeller 60 through the valve port 30, conduit 24 and to the pump housing port 26 (FIG. 6D). The impeller 60 then returns the cleaned water to the aquarium tank impeller 16 through the port 22.

With the impeller housing 62 and valve member 82 in the position shown in FIG. 6, the filter system of the present invention circulates water through the filter assembly 40 under a negative pressure thus minimizing the dissolution of harmful gases within the water. Furthermore, since the direction of water circulation through the filter assembly 40 remains the same regardless of whether vacuum or pressure pumping is used, backflushing of the filter assembly is completely avoided. In order to prevent any backflushing through the transition period from pressure to vacuum pumping, the knob 84, and thus the valve member 82, is preferably first positioned at a midposition 90 (FIG. 6A) while the impeller housing 62 is rotated from its first position (FIG. 5B) and to its second position (FIG. 6B) and then the valve member 82 is finally rotated to its second position (FIG. 6A).

From the foregoing, it can be seen that aquarium filtering system of the present invention provides a combination pressure and vacuum filtering system. As such, the system of the present invention enjoys the advantages of pressure systems, i.e. self priming, as well as the advantages of vacuum systems, i.e. minimizing the dissolution of harmful gasses within the water.

Having described my invention, however, many modifications thereto will become apparent to those skilled in the art to which it pertains without deviation from the spirit of the invention as defined by the scope of the appended claims.

I claim:

1. A filtering system for an aquarium having a tank in which water is contained comprising:
    a filter having an inlet and an outlet,
    a pump having a first port and second pump port being open to said aquarium,
    a valve assembly having two ports,
    means for selectively fluidly connecting either of said valve ports to said filter inlet and the other of said valve ports to said filter outlet,
    means for fluidly connecting one of said valve ports to said aquarium tank,
    means for fluidly connecting the other of said valve ports to said first pump port,
    means for selectively pumping water from either of said pump ports and toward the other of said pump ports.

2. The invention as defined in claim 1 wherein said selective pumping means comprises
    a pump housing, said pump ports being formed on said pump housing,
    an impeller housing having an inlet tube and an outlet tube,
    an impeller rotatably mounted in said impeller housing,
    means for rotatably driving said impeller so that said impeller pumps fluid from said inlet tube and to said outlet tube, and
    means for selectively fluidly connecting said impeller inlet tube to either of said pump ports and said impeller outlet tube to the other of said pump ports.

3. The invention as defined in claim 2 wherein said last mentioned means comprises means for rotatably mounting said impeller housing in said pump housing, and means for rotating said impeller housing between two predetermined rotational positions.

4. The invention as defined in claim 3 wherein said pump housing is substantially cylindrical and wherein said pump ports are diametrically opposed.

5. The invention as defined in claim 1 wherein said valve assembly comprises a substantially cylindrical housing, said filter inlet and outlet being open to said valve housing at circumferentially spaced positions around said housing, one of said valve ports being open coaxially to one end of said valve housing and the other port being open to said valve housing at a position radially spaced from said first port, a valve member comprising a fluid conduit having one end open to said first part and means for fluidly connecting the other end of the conduit to either said filter inlet or said filter outlet.

6. The invention as defined in claim 5 wherein said last mentioned means comprises means for rotating said valve member between a first position in which said other end of said conduit registers with said filter inlet and a second position in which said valve member registers with said filter outlet.

* * * * *